United States Patent [19]

Ridenour

[11] Patent Number: 4,585,255
[45] Date of Patent: Apr. 29, 1986

[54] HEAVY DUTY TUBE COUPLING

[75] Inventor: Ralph G. Ridenour, Mansfield, Ohio

[73] Assignee: Universal Enterprises Inc., Mansfield, Ohio

[21] Appl. No.: 519,366

[22] Filed: Aug. 1, 1983

[51] Int. Cl.[4] ............................................. F16L 35/00
[52] U.S. Cl. ..................................... 285/93; 285/322; 285/331; 285/351; 285/382.2; 29/508; 29/521
[58] Field of Search .................. 285/331, 382.2, 322, 285/93, 323, 351; 29/506, 508, 521

[56] References Cited

U.S. PATENT DOCUMENTS

| 927,388 | 7/1909 | Watkins . | |
|---|---|---|---|
| 2,588,827 | 3/1952 | Gouch | 285/322 |
| 3,025,086 | 3/1962 | Mosely . | |
| 3,375,026 | 3/1968 | Szohatzky . | |
| 3,454,290 | 7/1969 | Tairraz . | |
| 3,476,412 | 11/1969 | Demler . | |
| 3,493,250 | 3/1970 | Hertel . | |
| 3,685,860 | 8/1972 | Schmidt . | |
| 3,834,743 | 9/1974 | Strybel . | |
| 4,061,367 | 12/1977 | Moebius | 285/382.2 |
| 4,162,802 | 7/1979 | Cox . | |
| 4,277,091 | 7/1981 | Hunter | 285/382.2 X |

FOREIGN PATENT DOCUMENTS

| 6803452 | 10/1968 | Netherlands | 285/322 |
|---|---|---|---|
| 19873 | 9/1909 | United Kingdom | 285/331 |
| 875742 | 8/1961 | United Kingdom . | |
| 1162344 | 8/1964 | United Kingdom . | |

OTHER PUBLICATIONS

The Weatherhead Co., Flareless Tube Fitting Catalog page on Series 2600.

Primary Examiner—Dave W. Arola
Attorney, Agent, or Firm—Pearne, Gordon, Sessions, McCoy, Granger, Tilberry

[57] ABSTRACT

A tube coupling with only a body and a threaded member is disclosed, the threaded member usually being a nut to overlie an outer sleeve and an inner sleeve unitary with the body. These two sleeves define therebetween an annular groove to receive the end of the tube. The method of tightening the nut onto the body provides that a generally conical cam surface on the nut interacts with a shallower taper conical cam follower surface on the outer sleeve to force this cam follower surface radially inwardly and longitudinally inwardly forming annular radially inward bulges on the outer and inner sleeves and on the tube trapped therebetween. This interlocks the tube with the coupling, and provides a fluid seal at three different places, the inner wall of the tube, the outer wall of the tube, and the end of the tube at the bottom of the groove. The foregoing abstract is merely a resume of one general application, is not a complete discussion of all principles of operation or applications, and is not to be construed as a limitation on the scope of the claimed subject matter.

21 Claims, 5 Drawing Figures

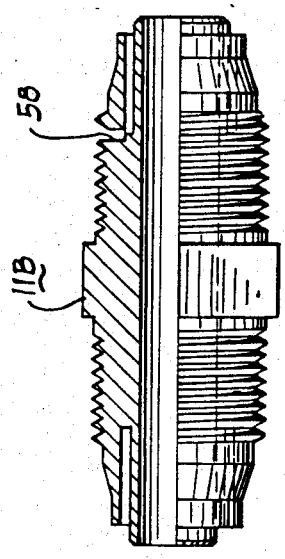
Fig. 1
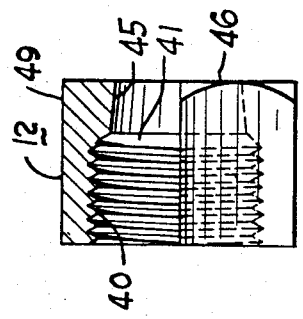
Fig. 3
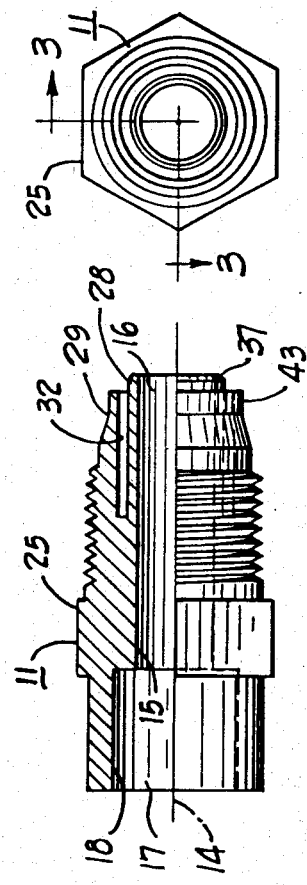
Fig. 5
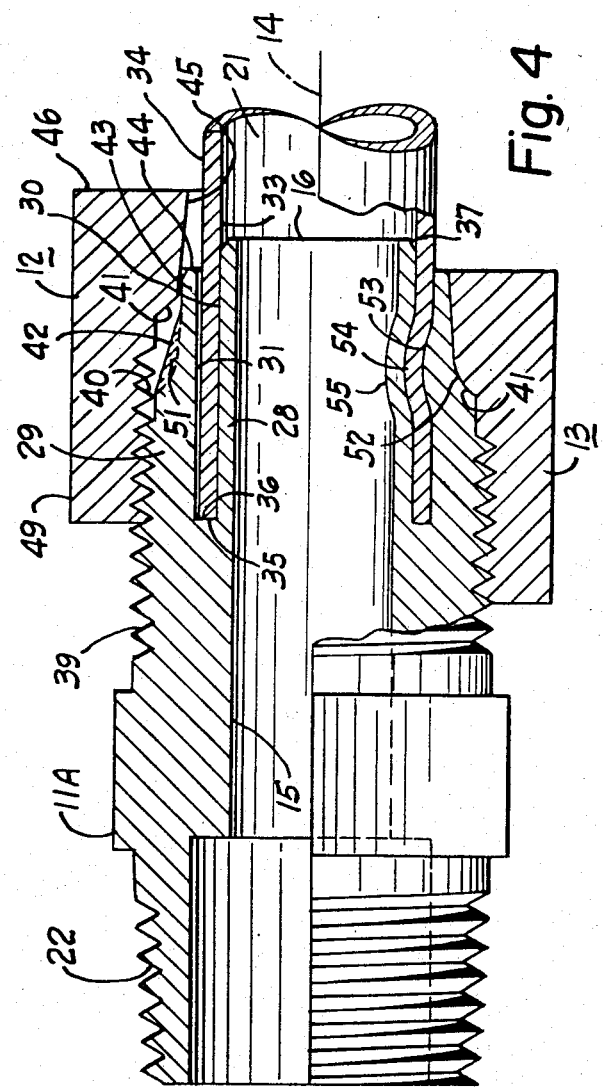
Fig. 2
Fig. 4

HEAVY DUTY TUBE COUPLING

BACKGROUND OF THE INVENTION

Couplings to connect to a flared end of a tube have often been a two-part fitting of a body and a nut. However, this requires flaring the end of the tubing, and in many cases this is inconvenient or difficult. Accordingly, straight tubing or non-flared tubing has also been attempted to be secured to a coupling, and two-part couplings have been utilized, as in U.S. Pat. No. 927,388, and on small diameter tubes, as in U.S. Pat. No. 3,375,026. Three-part tube couplings for non-flared tubes have been more common, including those disclosed in U.S. Pat. Nos. 3,025,086; 3,454,290; 3,834,743; and 4,162,802. Also, The Weatherhead Company has disclosed a three-part flareless tube fitting in its 2600 Series of tube fittings. Four-part tube fittings have also been disclosed, as in U.S. Pat. Nos. 3,493,250 and 3,685,860.

These tube fittings have met with differing degrees of success, usually for low and medium pressure, because at high pressure it was difficult to make certain that the tube did not blow out of the tube coupling.

In air conditioning, refrigeration and heat pump units which are stationary units, there is still the problem of vibration and a desire to seal the refrigerant without any leakage. In such a case, the typical connection for the refrigerant tubing was to use some form of hermetic seal rather than a threaded coupling seal. Such hermetic seals included inert gas brazing or silver solder rather than relying on a threaded coupling which might fail after a long period of use and require a service call, which was usually quite expensive for the manufacturer or installer. The rather slight vibration caused by the running of the compressor could cause metal fatigue and failure of threaded couplings; hence, these were generally avoided.

Automotive air conditioning added additional problems to try to obtain a leak-free tubing connection, namely: the wide temperature range from below 0° F. to above 100° F. under the hood of a modern automobile; the vibration of the automobile engine; and the road shocks as the automobile hit chuck holes, etc.

Cryogenic air conditioning apparatus utilized in industry and medical applications created possibly even worse ambient conditions, with temperatures varying widely from ordinary room temperature of 70° F. down to −80° F., or even −120° F., together with the vibration from the compressor. As a result, in such automotive and cryogenic air conditioning applications, the practice almost universally has been to utilize some form of hermetic seal on the tubing connections rather than to trust to any form of a threaded connection. Nevertheless, failures have occurred out in the field, where it was up to the service man make a repair joint without access to any production equipment as found in the usual manufacturing facility, e.g., without benefit of any inert gas brazing equipment.

A difficulty with the two-part hose couplings disclosed in the prior art U.S. Pat. No. 927,388 was that the external sleeve thereon was slotted longitudinally to permit the sleeve to be compressed radially inwardly, and thus this effectively cut in half the length of the leakage path, which could be satisfactory for a low pressure hose but unsatisfactory for a high pressure tube connection. The two-part tube coupling of the prior art U.S. Pat. No. 3,375,026 was only for use with very small diameter tubing, e.g., 1/16 inch outside diameter, and the force required to longitudinally move the compression sleeve would be extremely high in larger sizes of tubing. Also, such coupling could be one where vibration would vibrate loose such compression sleeve.

The difficulty with the three-piece tube couplings employing a separate external sleeve was that upon turning the nut, the friction between the external sleeve and the nut tended to rotate the sleeve, which tended to twist the tube, and if the tube were of soft material, the tube could be twisted off before a tight seal was made. Further, with aluminum tubing, a small score mark, as an annular score around the tube, weakened the tube sufficiently so that subsequent vibration could cause metal fatigue and breakage of the tube at such annular score line.

The four-part tube couplings of the prior art were intended for use with plastic tubing, which had little compressive strength in a radially inward direction and required the insertion of an inner sleeve, yet this created an additional junction whereat leakage could occur rather than minimizing the locations where leakage could occur.

SUMMARY OF THE INVENTION

The problem to be solved, therefore, is how to achieve a threaded connection in a flareless tube coupling which can readily be made out in the field with use of simple tools, such as open end wrenches, and yet which will seal high fluid pressure up to the bursting strength of the tube, withstand large temperature shocks, vibration, and physical shocks.

This problem is solved by a tube coupling consisting of only two pieces: a body and a threaded member; interengageable threads on said body and said threaded member, said body having an aperture for fluid under pressure, a unitary inner sleeve and a unitary outer sleeve on said body each substantially coaxially surrounding said aperture and defining a metal tube-receiving annular groove therebetween extending into said body from a first end thereof, said threaded member adapted to have an annular inner surface overlying said outer sleeve of said body and to have a first end adjacent said first end of said body in the assembled condition, an annular cam surface on the inner surface of said threaded member reducing in cross-sectional area toward said first end of said threaded member, an annular cam follower outer surface on said outer sleeve of said body reducing to a smaller diameter toward said first end of said body, and whereby with a tube in place in said annular groove the threaded member may be tightened on the body to have said cam surface and cam follower surface interact and the unitary outer sleeve crushed inwardly onto the outer surface of the tube to form a fluid pressure-tight seal of at least several atmospheres between the body and the tube.

This problem is further solved by a tube coupling having a body with threads and a threaded member threadably connectable thereto, an inner sleeve and an outer sleeve on said body defining an annular groove therebetween to receive the end of a metal tube, a cam on said threaded member and a cam follower on said outer sleeve radially inwardly compressible by the cam to engage the outer surface of the tube for a fluidtight seal, the provision of said inner and outer sleeves being unitary with said body for a long fluid leakage path, and said cam and cam follower having relative rotation during threaded tightening of the threaded member with absence of rotation among the tube and inner and outer sleeves.

The problem is further solved by the method of obtaining a fluidtight seal in a tube coupling having only a body and an interengaging threaded member, the body having unitary inner and outer sleeves defining an annular tube-receiving groove therebetween extending into a first end of the body, and a cam follower on the outer sleeve engageable by a cam on the threaded member, said method comprising the steps of inserting an end of a tube longitudinally into the annular groove until the end of the tube engages the bottom of the groove, and tightening the threaded member to engage the cam with the cam follower and the corresponding annular portion of the outer sleeve compressing in a radially inward direction and engaging the outer surface of the tube to make a fluidtight seal between the inner sleeve and the inner surface of the tube, with relative rotation between the cam and follower and an absence of rotation among the tube and inner and outer sleeves.

Accordingly, an object of the invention is to provide a two-part tube coupling for a flareless tube which is easily applied in the field with only two open-end wrenches.

Another object of the invention is to provide a two-part tube coupling with a long leakage path to minimize the possibility of leakage.

A further object of the invention is to provide a two-part tube coupling which actually seals at three different areas to minimize the possibility of leakage.

Other objects and a fuller understanding of the invention may be had by referring to the following description and claims, taken in conjunction with the accompanying drawing.

BRIEF DESCRIPTION OF THE DRAWINGS

FIG. 1 is a longitudinal view, partly in section, of the body of a tube coupling embodying the invention;

FIG. 2 is an end view of the body of FIG. 1;

FIG. 3 is a longitudinal view, partly in section, of a nut used with the body of FIG. 1;

FIG. 4 is a longitudinal view, partly in section, of a modified tube coupling showing partly assembled and assembled conditions; and FIG. 5 is a longitudinal view, partially in section, of a still further embodiment of the invention.

DESCRIPTION OF THE PREFERRED EMBODIMENTS

FIGS. 1 and 2 illustrate a body 11 which, together with a nut 12 shown in FIG. 3, may be threadably assembled to form a tube coupling 13. This tube coupling 13 is shown in a partly assembled condition in the upper half of FIG. 4 and in a tightened condition in the lower half of FIG. 4.

FIG. 1 illustrates that the body 11 has a longitudinal axis 14, with a central aperture 15 therein adapted to contain a fluid under pressure. The body 11 has a first end 16 and a second end 17. The second end of the body 11 is adapted to have an enlarged aperture 18 to receive the outside diameter of a tube, such as a copper tube (not shown), by means of a brazed or silver-soldered connection. As such, the body 11 of FIGS. 1 and 2 is adapted to be used as a transition fitting for a transition between such copper tube and aluminum tube 21, as shown in FIG. 4. To this end, the body 11 may be made of brass to be compatible with both the copper tube and the aluminum tube. In FIG. 4, a body 11A is disclosed and the difference from FIGS. 1 and 2 is that at the second end of this body a taper thread connection 22 is utilized in order to provide connection to some other unit, for example, a manifold. In FIG. 5, a body 11B is disclosed, which is a double-ended body and which may be utilized as a splice connection between two tubes, such as two aluminum tubes, or between tubes of different materials, e.g., aluminum and copper.

Each of the bodies 11, 11A and 11B utilizes a hexagonal wrench pad 25 for engagement by a suitable tool, e.g., an open-end wrench. The bodies 11, 11A and 11B are all identical at the first end 16 thereof, so the enlarged view of FIG. 4 will be primarily utilized to describe the construction which is applicable to all of the embodiments. The body 11 is a one-piece body having a unitary inner sleeve 28 and a unitary outer sleeve 29, each substantially coaxial and spaced apart so that an outer surface 30 of the inner sleeve 28 and an inner surface 31 of the outer sleeve 29 are substantially cylindrical and define a cylindrical annular groove 32 extending into the body 11 from the first end 16. This is an annular groove to receive a metal tube 21, which has an inner surface 33 and an outer surface 34, and an end 35 adapted to be inserted until it strikes the bottom 36 of the groove 32. Preferably, one or the other of the inner and outer sleeves 28 and 29 is longer than the other, to aid insertion of the tube end 35 into the groove 32, in case the end of the tube is not perfectly cylindrical. In the preferred embodiment, the inner sleeve 28 is made longer than the outer sleeve and has a slight chamfer 37, also to aid insertion of the tube.

The nut 12 is a threaded member which is adapted to threadably engage the body 11. It may have male threads or female threads and, as shown, it is a nut having female threads 40 on an inner surface thereof which encircles the outer sleeve 29. Those threads 40 engage male threads 39 on the body 11. The nut 12 carries a cam surface 41, which is an annular surface for coaction with an annular cam follower surface 42 on the outer sleeve 29. In the preferred embodiment, this cam surface 41 is a rather steep cone of about a 45-degree angle to cooperate with preferably a conical cam follower 42 of a lesser conical angle, e.g., 14 degrees, each relative to the axis 14. A substantially cylindrical extension 43 is provided on the outer sleeve 29 outboard of the cam follower surface 42, and has an outer end 44. The nut 12 has a slightly conical, tapered aperture 45 at the first end 46 thereof adapted to overlie this cylindrical extension 43. In the assembled and tightened condition of the tube coupling 13, the first end 46 of the nut is adapted to be adjacent to the first end 16 of the body 11, as better shown in the lower half of FIG. 4. The nut 12 is adapted to accommodate a tool, and to this end may have a hexagonal wrench pad 49, e.g., for engagement by an open-end wrench.

In operation, the tube coupling 13 may be utilized in many different ways. It may be used as a repair joint for a break in a tube, in which case the body 11B of FIG. 5 could be utilized. It may be used as a connection to a manifold having threaded apertures, in which case the body 11A of FIG. 4 would be used. It may be used as a transition joint for connection to another tube of the same or different material, e.g., by inert gas brazing or silver solder, in which case the body 11 of FIG. 1 could be used. In all cases, only two simple open-end wrenches are required to tighten the tube coupling to its tightened and fluid-sealed condition.

The tube 21 is cut off perpendicular to the axis thereof, as by a rotatable hand-operated tube cutter. To avoid having the tube cutter indent the tube so much that the inside surface 33 thereof was deformed to a smaller diameter at the end 35, such tube cutter may merely score the outer surface part way into the wall thickness and then the tube repeatedly bent at the score line to snap it off. This is satisfactory with aluminum tubing, and also with copper tubing. The nut 12 is slipped over the end of the tube 21 and the end 35 of the tube 21 is then inserted into the annular groove 32 until the tube end strikes the bottom 36 of this groove. The tube inner and outer surfaces are generally closely received in the surfaces defining the groove, but owing to different wall thicknesses on commercially available tubing, there is usually some radial clearance both on the inside and the outside.

The nut is then brought up and threaded onto the body 11. The upper half of FIG. 4 illustrates the nut 12 when it has been tightened fingertight, and it becomes fingertight when the conical aperture 45 frictionally engages the outer end of the cylindrical extension 43 on the outer sleeve 29. Usually, this is about three or four turns from the fully tightened condition shown in the lower half of FIG. 4. About one or two more turns of the nut 12 with a wrench may easily be made until the cam surface 41 on the nut actually begins to engage the cam follower surface 42 on the outer sleeve 29. At this point, the nut 12 becomes progressively harder to turn because metal, primarily that of the cam follower surface 42, is being physically displaced. The annular volume 51 of metal in the double cross-hatched area on the upper half of FIG. 4 is generally that which is displaced (compare the upper and lower halves of FIG. 4). The lower half of FIG. 4 shows the fully tightened condition of the nut 12, whereat the cam 41 has had the inner corner 52 generally rounded, due to the compression and friction. The annular volume 51 of metal immediately inwardly of the cam follower 42 has been displaced generally radially inwardly, but also somewhat longitudinally, away from the first end 16 of the body 12. This longitudinal displacement of the tube 21 jams the end 35 of the tube against the bottom 36 of the groove and expands the wall thickness of the end of the tube so that it completely fills the groove 32. This has been found to be true even though the wall thickness is at the thin end of the range of thicknesses of commercially available tubing. This metal is now displaced inwardly to cause an inward annular bulge 53 on the inner surface 31 of the outer sleeve 29. This bulge takes up any radial clearance between the outer sleeve and the tube 21 and compresses the tube sufficiently so that an inward annular bulge 54 of somewhat larger radius is provided on the inner surface 33 of the tube 21. This bulge 54, in turn, takes up any radial clearance between the inner tube wall and the inner sleeve 28, and causes a corresponding annular bulge 55, again of somewhat larger radius, on the inner surface forming the central aperture 15.

These bulges 53, 54, and 55 accomplish two things: a physical interlocking of the tube 21 and tube coupling 13, and a fluidtight seal at three different locations. The physical interlocking of the tube and coupling occurs because the bulges 53 and 54 are in the form of an annular inward deformation of the tube wall, so that it effectively interlocks with the body 11. Even if the nut 12 is subsequently unthreaded, the tube 21 cannot be pulled out by hand, or even with any reasonable force.

When the nut 12 as been tightened as shown in the lower half of FIG. 4, the outer end 46 of the outer sleeve 29 is visible and generally flush with the first end 46 of the nut 12. This will vary slightly in accordance with the actual thickness of the tube wall. For ⅜ inch tube, which is the outside diameter thereof, the tube wall will vary in commercially available tubes from 0.028 inch to 0.035 inch in thickness. When tubing of the thicker wall, such as 0.035 inch, is used, the first end 44 does not usually come out quite to the first end 46 of the nut. The action of the tightening and sealing moves the bulge 53 radially inwardly, but also has a longitudinally inward component which moves the tube 21 longitudinally inwardly to force the tube end 35 tightly against the bottom of the groove 36 to make a seal thereagainst. Where a thinner wall tube, such as 0.028 inch wall thickness, is utilized, it will be appreciated that the nut 12 will turn onto the body further in displacing enough volume of metal to create the bulges 53, 54, and 55, and hence usually part of the end of the cylindrical extension 43 is observed past the first end 46 of the nut 12.

This cylindrical extension 43 is no longer cylindrical, but is forced into a conical shape, as shown in the lower half of FIG. 4, and is forced tightly against the outer surface 34 of the tube 21. The purpose of this is to preclude entrance of moisture between the extension 43 and the conical aperture 45, and between the extension 43 and the outer tube wall 34. By so precluding entrance of moisture, this moisture cannot freeze, creating ice to possibly damage the tubing 21 or nut 12 in case the coupling 13 is used in air conditioning or the like applications.

The fluidtight seal is an especially valuable feature of the present invention because it has been determined that the fluidtight seal occurs at not only one place but at actually three different locations. It has been determined through tests that the first seal is at the bulge 54, the second seal is at the end of the tube 35, and the third seal is at the bulge 53.

To test to determine that there is a seal at the bulge 54 between the inner surface 33 of the tube and the outer surface 30 of the inner sleeve 28, the tube 21 is inserted the full depth and then pulled back a short distance, e.g., 0.025 inch. The nut 12 is then tightened down in the usual manner, about until the outer end 44 of the outer sleeve 29 is visible and generally flush with the first end 46 of the nut 12.

With the nut 12 tightened, then for test purposes, an arcuate slot 58 is cut with a circular cutter through the nut 12 at one peripheral location and through a part of the outer sleeve 29, as shown in FIG. 5, to provide access to the bottom 36 of the groove 32. Then by using a helium sniffer connected to a helium mass spectrometer and pressurizing the tubing 21 and coupling 13 with helium at up to 1000 psi, it can be determined that there are no leaks. This establishes the fact that there is a first seal at the bulge 54 between the tube inner surface 33 and the inner sleeve outer surface 30.

Next, to demonstrate the establishment of the second seal between the tube end 35 and the bottom 36 of the groove 32, a deep, longitudinal score line is scratched into the inner surface 33 of the tube wall for the length on one tube diameter. This score line must be deep, e.g., 0.020 inch. Otherwise, the coining of the metal during the tightening can seal a lesser scratch, e.g., one of only 0.010 inch deep. The tube 21 is bottomed against the bottom 36 of the groove 32 for this test, and the nut tightened as before. Then the arcuate test slot 58 is again cut through a part of the nut 12 and the outer sleeve 29 just until the outer surface 34 of the tube 21 is encountered. This deep longitudinal scribe line has established that the first seal at the bulge 54 is ruined. Again, the tube 21 and coupling 13 are pressurized at up to 1000 psi with helium and the sniffer on the helium mass spectrometer has again assured in several tests that there is an annular seal established at the tube end 35 and bottom 36 of the groove to withstand high fluid pressures.

The third test to establish the fluidtight seal at the bulge 53 is similar in that the inside wall 33 of the tubing is again longitudinally scored deeply, e.g., 0.020 inch, the tube is inserted the full depth and then moved back a short distance, e.g., 0.025 inch, and the nut 12 tightened as before. The deep longitudinal score line has assured that the first seal is not effective, and the retraction of the tube 0.025 inch has assured that the second seal is not effective. Thus, the only place where there is an effective seal is at the bulge 53. Repeated tests sniffing at the first end 46 of the nut 12 with the sniffer connected to the helium mass spectrometer and the tubing 21 and coupling 13 pressurized at up to 1000 psi with helium have demonstrated the effectiveness of such third fluid seal.

The tube couplings constructed in accordance with this invention have successfully passed three successive tests for thermal shock, pressure testing, and vibration, according to the following test procedure:

TEST PROCEDURE FOR ALUMINUM MECHANICAL JOINTS

Vacuum and sniffing with helium mass spectrometer. Sensitivity on vacuum to be $1 \times 10^{-11}$, sniffing to be done at $1 \times 10^{-8}$ on expanded scale of lower ⅓. No evidence of leak permissible.
1. Thermal shock consisting of 600 psi, helium, and:
   A. Six immersions in liquid nitrogen and boiling water in rapid succession from $-320.4°$ F. to $+212°$ F.
   B. One test with joint sniffed at $-320.4°$ F.
   C. One test with joint sniffed at $+210°$ F.
2. Pressure test at 1200 psi helium and joint heated to 550° F. for one-half hour.
3. Pressure test to 3500 psi hydraulic, tubing bursting (0.050 wall) with no evidence of joint yield, tubing repaired and flushed out thoroughly and pressure-tested at 1200 psi helium. Thermal shock test repeated.
4. Pulsating, hydraulic shock at 450 psi for one million cycles, retest at 1200 psi helium and repeat thermal shock.
5. Twisting torsional test with ends held two inches away from the joint and two full turns made. Test at 1200 psi helium and repeat thermal shock.
6. Vibration test, ¼" deflection at 1750 rpm until tubing yields. Test at 1200 psi helium and repeat thermal shock.

Test concluded. Sequence of test can be altered.

The drawing of FIG. 4 is enlarged, but is approximately to scale according to a ⅜ inch diameter tubing 21 and fitting 13, which have been actually constructed and tested. For such ⅜ inch diameter tubing, the dimensions of the parts are in accordance with Table A:

TABLE A

| | |
|---|---|
| Outside diameter of tube 21 | .375" |
| Wall thickness of tube 21 | .028" to .035" |
| Inside diameter of aperture 15 | .250" |

TABLE A-continued

| | |
|---|---|
| Outside diameter of inner sleeve 28 | .302" |
| Inside diameter of outer sleeve 29 | .382" |
| Outside diameter of extension 43 | .418" |
| Outside diameter of cam follower 42 | .488" |
| Angle of cam 41 | 45° |
| Angle of follower 42 | 14° |
| Depth of groove 32 | .375" |
| Inside diameter of cam 41 | .420" |
| Inside diameter of nut at end 46 | .400" |

From the above description, it will be apparent that the cam surface 41 and the cam follower surface 42 are annular surfaces reducing in diameter toward the first end 46 of the nut 12 or body 11. The interaction of these two surfaces establishes that the outer sleeve 29 is crushed or compressed generally radially inwardly and also somewhat longitudinally away from the first end of the body 11 in effecting the fluidtight seals at the three different locations of bulges 53, 54, and groove bottom 36. The bulges 53, 54, and 55 are intermediate the length of the outer sleeve 29 to aid in the physical interlocking of the tube 21 and coupling 13.

The fact that the inner sleeve 28 and outer sleeve 29 are unitary with the body 11 achieves the desirable result of a very long fluid leakage path which is the length of the inner sleeve 28 plus the length of the outer sleeve 29. There are three different annular seals achieved along this long fluid leakage path, and this undoubtedly is the reason that the coupling is successful at sealing fluid pressures high enough to burst the tubing, and despite high vibration and thermal shocks. The slight longitudinal movement of the volume of metal 51 is thought to dig into the outer surface of the metal tube and cause that metal tube to move longitudinally also. As a test of this longitudinal movement of the tube 21, in the ⅜ O.D. size of tubing 21, the nut 12 has been initially tightened only until the cam 41 begins to engage the cam follower 42. If a scribe line is placed on the outer surface 34 of the tubing 21 at the first end 46 of the nut, and then the nut 12 is tightened down until the end 44 of the cylindrical extension 43 is visible, indicating the fully tightened condition, and the distance to the end of the nut to the scribe line is measured, it was found that this distance might be 0.040 inch as an example. This is about one complete rotation of the nut for 24 threads-per-inch of the threads 39 or 40.

Another fitting 13 is prepared with this same tubing wall thickness and, in this case, after the nut has been tightened enough so that the cam 41 just engages the cam follower 42, then a first scribe mark is made on the outer surface 34 of the tube at the nut first end 46. The tube 21 is then pulled out a short distance, e.g., 0.012 inch. The nut is then again tightened one full revolution so that it is in the fully tightened condition, with the end 44 of extension 43 visible at the nut first end 46. One would then expect the scribe line to be 0.040+0.012 inch, or 0.052 inch away from the first end 46, yet upon actual testing it has been found that the scribe line is only 0.040 inch away from the first end 46, indicating that the tube 21 has been moved inwardly 0.012 inch during the tightening as caused by the longitudinal displacement of the metal forming the bulges 53, 54, and 55.

The unitary inner and outer sleeves 28 and 29 not only provide the long fluid leakage paths, but also establish that during tightening of the nut 12, there will be an absence of rotation among the tube and inner and outer sleeves. This is quite important in many cases. Where a soft aluminum tube is utilized, this tube was often twisted by the prior art three-piece fittings because the friction between the nut and the separate outer sleeve tended to rotate the outer sleeve and to frictionally rotate the tubing as the nut was tightened. This could twist off the tubing, or at least weaken it sufficiently so that it would be totally unsuitable for use with refrigeration or air conditioning equipment. In the present invention, the relative rotation is only between the cam 41 and cam follower 42, and there is no rotation between the outer sleeve 29 and tube 21, nor between tube 21 and the inner sleeve 28. The coupling 13 may be used with any tube of malleable material, including plastic, stainless steel, and even titanium. So long as it is malleable, it will not develop any cracks, even hairline cracks, which could cause leaks.

The present invention provides a highly novel method of obtaining a fluidtight seal in a tube coupling by utilizing only a two-part coupling with a unitary inner and outer sleeve. The tube is inserted into the groove defined between these two sleeves and the tightening of the nut achieves the compression of the outer sleeve in a generally radially inward direction to achieve the fluidtight seal and the unitary inner and outer sleeves assure that these two sleeves and tube will remain stationary, i.e., non-rotating, during the tightening process.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube coupling consisting of only two pieces: a body and a threaded member; interengageable threads on said body and said threaded member; said body having an aperture for fluid under pressure; a unitary inner sleeve and a unitary outer sleeve on said body each substantially coaxially surrounding said aperture and defining a metal tube-receiving annular groove therebetween extending into said body from a first end thereof; said threaded member adapted to have an annular inner surface overlying said outer sleeve of said body and to have a first end adjacent said first end of said body in the assembled condition; an annular cam surface on the inner surface of said threaded member reducing in cross-sectional area toward said first end of said threaded member; an annular cam follower outer surface intermediate the longitudinal ends of said outer sleeve of said body reducing to a smaller diameter toward said first end of said body; said unitary inner sleeve having an outer end at said body first end and an intermediate annular area longitudinally intermediate said outer end and the bottom of said annular groove; and whereby with a tube in place in said annular groove the threaded member may be tightened on the body to have said cam surface and cam follower surface interact and the unitary outer sleeve crushed inwardly in an annular area intermediate the longitudinal ends thereof onto the outer surface of the tube and the tube and unitary inner sleeve crushed radially inwardly only in said intermediate annular area to form a fluid pressure-tight seal of at least several atmospheres between the body and the tube.

2. A tube coupling as set forth in claim 1, wherein said threaded member is a nut having female threads interengageable with male threads on said body.

3. A tube coupling as set forth in claim 1, wherein one of said cam and cam follower surfaces is conical.

4. A tube coupling as set forth in claim 1, wherein each of said cam and cam follower surfaces is conical, with the cone of the cam surface having a larger conical angle than that of said cam follower surface.

5. A tube coupling as set forth in claim 1, wherein one of said inner and outer sleeves is longer than the other to aid in insertion of a tube end into said groove.

6. A tube coupling as set forth in claim 1, wherein said inner sleeve is longer than said outer sleeve to aid in insertion of a tube end into said groove.

7. A tube coupling as set forth in claim 1, including a substantially cylindrical extension on said outer sleeve at said first end of said body to be visible at said first end of said threaded member upon tightening of said threaded member and body.

8. A tube coupling as set forth in claim 7, including an aperture in said threaded member to overlie said substantially cylindrical extension in the tightened condition of the coupling.

9. A tube coupling as set forth in claim 8, wherein said aperture in said threaded member has a slight conical angle reducing in size toward said first end of said threaded member to radially inwardly squeeze said outer sleeve substantially cylindrical extension onto the tube in the tightened condition of the coupling to substantially preclude admission of moisture into the annular spaces among the tube, extension, and threaded member.

10. A tube coupling as set forth in claim 1, wherein said tightening establishes a fluidtight seal at three places, between the tube inner wall and said inner sleeve, between the tube outer wall and said outer sleeve, and between the end of the tube and the bottom of said groove.

11. A tube coupling as set forth in claim 1, wherein said inwardly crushed outer sleeve is at an area substantially radially inwardly of said cam follower surface and is an annular area.

12. In a tube coupling having a body with threads and a threaded member threadably connectable thereto, an inner sleeve and an outer sleeve on said body defining an annular groove therebetween to receive the end of a metal tube, a cam on said threaded member and a cam follower on said outer sleeve radially inwardly compressible by the cam to engage the outer surface of the tube for a fluidtight seal, the provision of said inner and outer sleeves being unitary with said body for a long fluid leakage path, said cam and cam follower having relative rotation during threaded tightening of the threaded member with absence of rotation among the tube and inner and outer sleeves, said cam follower being intermediate the longitudinal ends of said outer sleeve, whereby with a tube in place and the threaded member tightened the outer sleeve is annularly crushed radially inwardly and the tube and inner sleeves each being annularly crushed radially inwardly only in an area intermediate the length of the annular groove.

13. A tube coupling as set forth in claim 12, wherein said tube coupling consists of only two parts, the body and the threaded member.

14. A tube coupling as set forth in claim 12, wherein said cam is an annular cone on said threaded member and encircling said outer sleeve to compress a cam follower portion of said outer sleeve substantially radially inwardly to deform a corresponding portion of the tube radially inwardly against the inner sleeve.

15. A tube coupling as set forth in claim 14, wherein the cam has a greater included angle than said cam follower to develop a component of force forcing the longitudinal end of the tube against the bottom of the groove.

16. A tube coupling as set forth in claim 12, wherein the cam follower is a substantially conical portion on said outer sleeve.

17. A tube coupling as set forth in claim 16, including a substantially cylindrical extension on said conical cam follower and the end of which is visible external to said threaded member in the tightened condition of the tube coupling.

18. A tube coupling as set forth in claim 17, including a slightly conical taper on an aperture in said threaded member encircling said cylindrical extension and forcing it into substantially moisture-tight engagement with the outer surface of the tube in the tightened condition of the tube coupling.

19. The method of obtaining a fluid-tight seal in a tube coupling having only a body and an interengaging threaded member, the body having unitary inner and outer sleeves defining an annular tube-receiving groove therebetween extending into a first end of the body, and an annular cam follower intermediate the ends of the outer sleeve engageable by a cam on the threaded member, said method comprising the steps of:

inserting an end of a tube longitudinally into the annular groove until the end of the tube engages the bottom of the groove; and tightening the threaded member to engage the cam with the cam follower and causing the corresponding intermediate annular portion of the outer sleeve and only the intermediate annular portions of the inner sleeve and the tube to be compressed in a radially inward direction to make a fluidtight seal between the outer sleeve and the outer surface of the tube, with relative rotation between the cam and follower and an absence of rotation among the tube and inner and outer sleeves.

20. The method as set forth in claim 19, including compressing the annular cam follower generally radially inwardly and forming a fluidtight seal between the inner sleeve and the inner surface of the tube.

21. The method as set forth in claim 19, including forming the cam with a larger included angle than that of the cam follower and generating a component of force from the cam compressing the end of the tube longitudinally against the bottom of the groove forming a fluidtight seal therebetween.

* * * * *